United States Patent
Choo et al.

(10) Patent No.: US 9,215,352 B2
(45) Date of Patent: Dec. 15, 2015

(54) PIXEL CLOCK GENERATOR, DIGITAL TV INCLUDING THE SAME, AND METHOD OF GENERATING PIXEL CLOCK

(71) Applicants: Kang-Yeop Choo, Suwon-si (KR); Do-Hyung Kim, Seoul (KR); Tae-Ik Kim, Seongnam-si (KR); Jong-Bin Moon, Suwon-si (KR); Sang-Don Jung, Yongin-si (KR)

(72) Inventors: Kang-Yeop Choo, Suwon-si (KR); Do-Hyung Kim, Seoul (KR); Tae-Ik Kim, Seongnam-si (KR); Jong-Bin Moon, Suwon-si (KR); Sang-Don Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/444,176

(22) Filed: Jul. 28, 2014

(65) Prior Publication Data

US 2015/0062432 A1 Mar. 5, 2015

(30) Foreign Application Priority Data

Aug. 30, 2013 (KR) ........................ 10-2013-0104326

(51) Int. Cl.
*H04N 5/04* (2006.01)
*G09G 5/00* (2006.01)
*H04N 21/43* (2011.01)

(52) U.S. Cl.
CPC ................. *H04N 5/04* (2013.01); *G09G 5/008* (2013.01); *H04N 21/4305* (2013.01); *G09G 2350/00* (2013.01)

(58) Field of Classification Search
CPC .......... H04N 2201/04781; H04N 2201/04772; H04N 2201/04774; H04N 5/04; H04N 5/126; H04N 9/641; G09G 5/008; G09G 5/18; G09G 2350/00
See application file for complete search history.

(56) References Cited

U.S. PATENT DOCUMENTS

| | | | | |
|---|---|---|---|---|
| 5,912,714 A | * | 6/1999 | Kawamura | 348/555 |
| 5,943,098 A | * | 8/1999 | Lagarde et al. | 348/445 |
| 6,037,925 A | * | 3/2000 | Kim | 345/99 |
| 6,441,658 B1 | * | 8/2002 | Taraci et al. | 327/147 |
| 7,460,113 B2 | | 12/2008 | Swan | |
| 7,463,278 B2 | | 12/2008 | Ozasa et al. | |
| 7,791,634 B2 | | 9/2010 | Masui et al. | |
| 2002/0051137 A1 | * | 5/2002 | Ema et al. | 358/1.1 |

(Continued)

FOREIGN PATENT DOCUMENTS

JP 3911862 B2 5/2007
JP 4367840 B2 11/2009

OTHER PUBLICATIONS

Chung, Ching-Che et al., "A Fast Phase Tracking ADPLL for Video Pixel Clock Generation in 65 nm CMOS Technology," IEEE Journal of Solid-State Circuits, vol. 46, No. 10, Oct. 2011, pp. 2300-2311.

(Continued)

*Primary Examiner* — Victor Kostak
(74) *Attorney, Agent, or Firm* — Sughrue Mion, PLLC

(57) ABSTRACT

A pixel clock generator is provided. The pixel clock generator includes a phase-locked-loop (PLL) circuit that generates, from an oscillation signal having a first frequency of tens of MHz, a multi-phase oscillation signal having a second frequency of several GHz; and a frequency/phase adjusting circuit that synchronizes the multi-phase oscillation signal with a horizontal sync signal to generate a first oscillation signal, frequency-divides the first oscillation signal to generate a second oscillation signal, and adjusts a phase of the second oscillation signal to generate the pixel clock.

20 Claims, 10 Drawing Sheets

(56) References Cited

U.S. PATENT DOCUMENTS

| | | | |
|---|---|---|---|
| 2005/0212793 A1* | 9/2005 | Engelhardt et al. | 345/213 |
| 2009/0268091 A1* | 10/2009 | Kouyama | 348/515 |
| 2010/0052746 A1* | 3/2010 | Park et al. | 327/156 |
| 2010/0066425 A1* | 3/2010 | Hiraku | 327/298 |
| 2011/0243290 A1* | 10/2011 | Leach et al. | 375/376 |

OTHER PUBLICATIONS

Lee, Hyung-Rok et al., "A PVT-Tolerant Low-1/f Noise Dual-Loop Hybrid PLL in 0.181μm CMOS," ISSCC, Feb. 8, 2006, pp. 1-10.

Kim, Wooseok et al., "A 0.032mm$^2$ 3.1mW Synthesized Pixel Clock Generator with 30ps(rms) Integrated Jitter and 10-to-630MHz DCO Turning Range," ISSCC, Feb. 19, 2013, pp. 1-3.

* cited by examiner

PIXEL CLOCK GENERATOR, DIGITAL TV INCLUDING THE SAME, AND METHOD OF GENERATING PIXEL CLOCK

CROSS-REFERENCE TO RELATED APPLICATION

This application claims priority under 35 U.S.C. §119 to Korean Patent Application No. 10-2013-0104326 filed on Aug. 30, 2013, the disclosure of which is hereby incorporated by reference in its entirety.

BACKGROUND

1. Field

Devices, systems, methods, and articles of manufacture consistent with the inventive concept relate to a pixel clock generator, a television system and a video system including the pixel clock generator.

2. Description of Related Art

A pixel clock generator is a circuit block used when a video signal is output on a screen in a digital television system. The pixel clock generator generates a clock used for converting an analog signal to a digital signal.

SUMMARY

In accordance with an aspect of an exemplary embodiment, there is provided a pixel clock generator that includes a phase-locked-loop (PLL) circuit configured to generate, from an oscillation signal having a first frequency of tens of MHz, a multi-phase oscillation signal having a second frequency of several GHz; and a frequency/phase adjusting circuit configured to synchronize the multi-phase oscillation signal with a horizontal sync signal to generate a first oscillation signal, frequency-divide the first oscillation signal to generate a second oscillation signal, and adjust a phase of the second oscillation signal to generate a pixel clock.

The second oscillation signal may have a third frequency, and the third frequency may be suitable for controlling analog-digital conversion in a digital TV that includes the PLL circuit.

The third frequency may have a range of about 10 MHz to about 200 MHz.

The frequency/phase adjusting circuit may include a phase synchronizing circuit and a delay control circuit.

The phase synchronizing circuit may synchronize the multi-phase oscillation signal with the horizontal sync signal to generate the first oscillation signal, and the delay control circuit may frequency-divide the first oscillation signal to generate the second oscillation signal, and adjust the phase of the second oscillation signal to generate the pixel clock.

The pixel clock generator may select a bit having a phase nearest to the horizontal sync signal among bits of the multi-phase oscillation signal to synchronize the multi-phase oscillation signal with the horizontal sync signal.

The multi-phase oscillation signal may comprise a plurality of bit signals, and the phase synchronizing circuit may include a D-type flip-flop configured to sample the multi-phase oscillation signal in response to the horizontal sync signal, a decoder configured to decode an output signal of the D-type flip-flop, and a multiplexer configured to select a bit signal of the plurality of bit signals output from the decoder to generate the first oscillation signal.

The delay control circuit may comprise a plurality of unit delay control circuits cascade-connected to each other, wherein each of the unit delay control circuits may comprise a D-type flip-flop having a clock terminal to which an input signal is applied and a reset-bar terminal to which the horizontal sync signal is applied, wherein the input terminal and an inverted output terminal are electrically connected; and an exclusive OR gate having a first input terminal electrically connected to the inverted output terminal of the D-type flip-flop, a second input terminal to which one bit of a phase control signal is applied, and an output terminal from which an output signal of the unit delay control circuit is generated.

Each unit delay control circuit may frequency-divide the input signal of the unit delay control circuit by two to generate the output signal of the unit delay control circuit.

When the horizontal sync signal is enabled, all output signals of the unit delay control circuit may be a logic level "1".

The PLL circuit may omit an off-chip capacitor.

The pixel clock generator may further include a sync slicer configured to generate the horizontal sync signal (HSYNC) using an analog video signal.

In accordance with another aspect of an exemplary embodiment, there is provided a pixel clock generator that includes a phase-locked-loop (PLL) circuit configured to generate, from an oscillation signal having a first frequency, a multi-phase oscillation signal having a second frequency; a phase synchronizing circuit configured to synchronize the multi-phase oscillation signal with a horizontal sync signal to generate a first oscillation signal; and a delay control circuit configured to frequency-divide the first oscillation signal to generate a second oscillation signal, and adjust a phase of the second oscillation signal to generate a pixel clock.

The first frequency may be a frequency of from about 10 MHz to about 90 MHz and the second frequency may be a frequency of from about 10 GHz to 90 GHz.

The delay control circuit may receive a phase control signal, and bits of the phase control signal may be applied to adjust an initial condition of the delay control circuit.

A time between a first cycle and a second cycle of the pixel clock may be changed according to the initial condition of the delay control circuit.

The delay control circuit may receive a phase control signal, and bits of the phase control signal may be applied to adjust a delay time of the pixel clock.

The delay control circuit may receive a phase control signal, and bits of the phase control signal may be applied to adjust a phase of the pixel clock.

The PLL circuit may have a wide bandwidth.

In accordance with still another aspect of an exemplary embodiment, there is provided a digital television that includes a pixel clock generator configured to generate a pixel clock; and an image signal processor configured to perform an analog-to-digital (A/D) conversion and a frequency conversion on an image signal in response to the pixel clock, wherein the pixel clock generator comprises a phase-locked-loop (PLL) circuit configured to generate, from an oscillation signal having a first frequency of tens of MHz, a multi-phase oscillation signal having a second frequency of several GHz; and a frequency/phase adjusting circuit configured to synchronize the multi-phase oscillation signal with a horizontal sync signal to generate a first oscillation signal, frequency-divide the first oscillation signal to generate a second oscillation signal, and adjust a phase of the second oscillation signal to generate a pixel clock.

In accordance with yet another aspect of an exemplary embodiment, there is provided a method of generating a pixel clock used when a video signal is output on a screen, the method comprising generating, from an oscillation signal having a first frequency of tens of MHz, a multi-phase oscillation signal having a second frequency of several GHz; synchronizing the multi-phase oscillation signal with a horizontal sync signal (HSYNC) to generate a first oscillation signal; frequency-dividing the first oscillation signal to generate a second oscillation signal; and adjusting a phase of the second oscillation signal to generate the pixel clock.

Adjusting the phase of the second oscillation signal to generate the pixel clock may include receiving a phrase control signal, and applying bits of a phase control signal to adjust an initial condition of a delay control circuit.

BRIEF DESCRIPTION OF THE DRAWINGS

The foregoing and/or other aspects will be apparent from the more particular description of exemplary embodiments, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION

Figure 1:
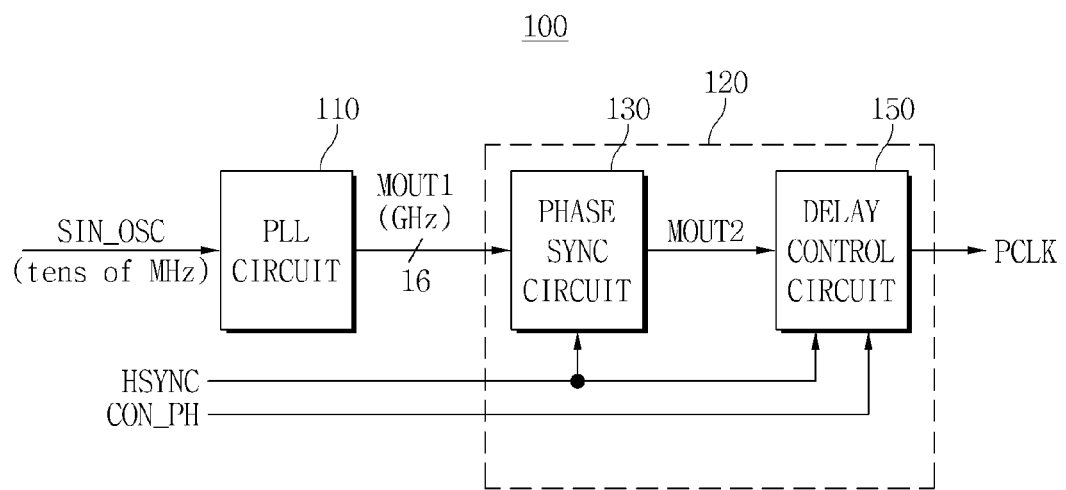
FIG. 1 is a block diagram illustrating a pixel clock generator in accordance with an exemplary embodiment.

Various exemplary embodiments will now be described more fully with reference to the accompanying drawings in which some exemplary embodiments are shown. These inventive concepts may, however, be embodied in different forms and should not be construed as limited to the exemplary embodiments set forth herein. Rather, these exemplary embodiments are provided so that this disclosure is thorough and complete and fully conveys the inventive concept to those skilled in the art. In the drawings, the sizes and relative sizes of layers and regions may be exaggerated for clarity.

It will be understood that when an element or layer is referred to as being "on," "connected to" or "coupled with" another element or layer, it can be directly on, connected or coupled to the other element or layer or intervening elements or layers may be present. In contrast, when an element is referred to as being "directly on," "directly connected to" or "directly coupled with" another element or layer, there are no intervening elements or layers present. Like numerals refer to like elements throughout. As used herein, the term "and/or" includes any and all combinations of one or more of the associated listed items.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could be termed a "second" element, component, region, layer or section without departing from the teachings of the present inventive concept.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a pixel clock generator in accordance with an exemplary embodiment.

Referring to FIG. 1, the pixel clock generator 100 may include a phase-locked-loop (PLL) circuit 110 and a frequency/phase adjusting circuit 120.

The PLL circuit 110 generates from an oscillating input signal SIN_OSC having a first frequency of on the order of tens of megahertz (MHz) a multi-phase oscillation signal MOUT1 having a second frequency on the order of several gigahertz (GHz). For example, the oscillating input signal SIN_OSC may have a first frequency from about 10 MHz to about 90 MHz, and the multi-phase oscillation signal MOUT1 may have a second frequency from about 1 GHz to about 9 GHz. Alternatively, the second frequency may be on the order of tens of gigahertz, for example, from 10 GHz to 90 GHz. The PLL circuit 110 uses the first frequency to generate the second frequency. The frequency/phase adjusting circuit 120 synchronizes the multi-phase oscillation signal MOUT1 with a horizontal sync signal HSYNC to generate a first oscillation signal MOUT2, frequency-divides the first oscillation signal MOUT2 to generate a second oscillation signal having a third frequency, and adjusts a phase of the second oscillation signal to generate a pixel clock PCLK. The oscillating input signal SIN_OSC may have a frequency that is higher than a frequency of the horizontal sync signal (HSYNC).

The frequency/phase adjusting circuit 120 may include a phase synchronizing (PHASE SYNC) circuit 130 and a delay control circuit 150. The phase sync circuit 130 synchronizes the multi-phase oscillation signal MOUT1 with the horizontal sync signal HSYNC to generate the first oscillation signal MOUT2. The delay control circuit 150 frequency-divides the first oscillation signal MOUT2 to generate the second oscillation signal, and adjusts the phase of the second oscillation signal to generate the pixel clock PCLK. In the exemplary embodiment of FIG. 1, the multi-phase oscillation signal MOUT1 may be a 16-bit signal. However, this is only an exemplary, and more of fewer bits are also contemplated.

The third frequency may be a frequency suitable for controlling an analog-digital conversion in a digital TV that includes the PLL circuit. For example, the third frequency may have a range of about 10 MHz to about 200 MHz.

In a related art pixel clock generator, a PLL circuit generates an output signal having tens or hundreds of MHz using a horizontal sync signal HSYNC having a low frequency of tens of KHz. Therefore, the related art pixel clock generator had to include an off-chip capacitor having large capacity in the PLL circuit. Moreover, the bandwidth of the related art PLL circuit is typically defined as a tenth (1/10) of an input frequency. Thus, in a related art PLL circuit in which HSYNC has a frequency range of 10-100 KHz, the bandwidth is very narrow.

By contrast, in the pixel clock generator 100 of FIG. 1, the PLL circuit 110 generates a multi-phase oscillation signal MOUT1 having a frequency of several GHz using an oscillating input signal SIN_OSC having a frequency of tens of MHz. Therefore, the pixel clock generator 100 according to an exemplary embodiment may include a PLL circuit 110 having a wide bandwidth while omitting an off-chip capacitor. That is, as used in this description, the term "wide" when referring to bandwidth denotes a frequency that is wider than a tenth of the frequency of a related art HSYNC. For example, the PLL circuit 110 may have a high frequency input signal on the order of, for example, 24 MHz, and therefore the bandwidth of the PLL circuit 110 is about 2.4 MHz which is very wide compared to the bandwidth of the related art PLL circuit. Further, the pixel clock generator 100 of FIG. 1 may use the delay control circuit 150 that has a simple circuit structure to adjust a phase of an output signal of the PLL circuit 110. The delay control circuit 150 is a kind of a frequency divider, and may perform a frequency-dividing function and a delay-adjusting function.

Figure 2:
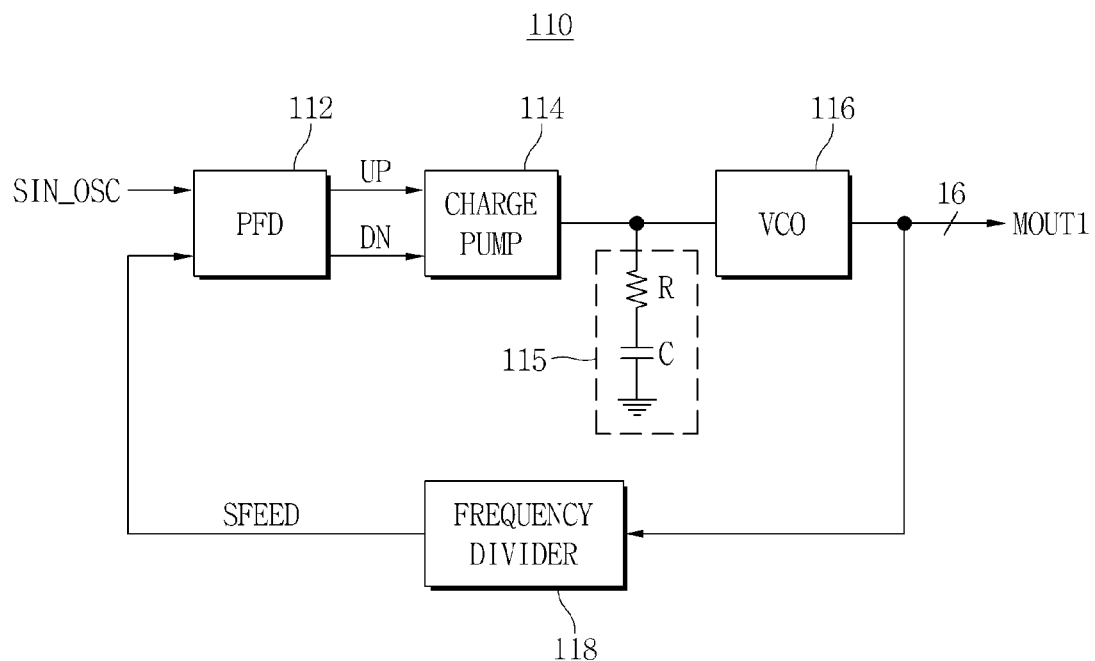
FIG. 2 is a circuit diagram illustrating an example of a phase-locked-loop (PLL) circuit included in the pixel clock generator of FIG. 1.

FIG. 2 is a circuit diagram illustrating an example of a phase-locked-loop (PLL) circuit included in the pixel clock generator of FIG. 1.

Referring to FIG. 2, the PLL circuit 110 may include a phase/frequency detector (PFD) 112, a charge pump 114, a loop filter 115, a voltage-controlled oscillator (VCO) 116 and a frequency divider 118.

The PFD 112 generates an up signal UP and a down signal DN based on a phase difference and a frequency difference between an oscillating input signal SIN_OSC and a feedback signal SFEED. The charge pump 114 generates a charge current and a discharge current in response to the up signal UP and the down signal DN. The loop filter 115 integrates a charge current and a discharge current which occur in the charge pump 114. The loop filter 115 may include a resistor R and a capacitor C connected in series. Therefore, an oscillation control voltage, that is an input of the VCO 116, may be an integrated value of an output current of the charge pump 114. The VCO 116 generates the multi-phase oscillation signal MOUT1, the frequency of which is changed according to a magnitude of the oscillation control voltage. The frequency divider 118 divides a frequency of the multi-phase oscillation signal MOUT1 with a certain value.

As described above, the PLL circuit 110 may generate a multi-phase oscillation signal MOUT1 having a second frequency of several GHz using an oscillating input signal SIN_OSC having a first frequency of tens of MHz.

Figure 3:
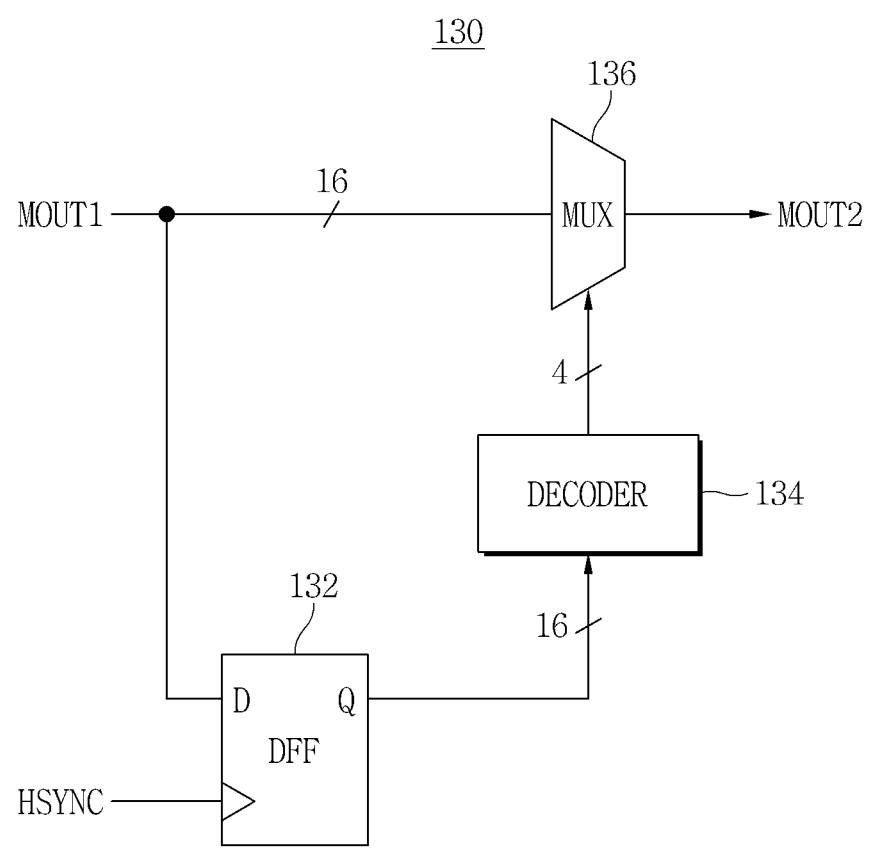
FIG. 3 is a circuit diagram illustrating an example of a phase synchronizing circuit included in the pixel clock generator of FIG. 1.

FIG. 3 is a circuit diagram illustrating an example of a phase synchronizing circuit included in the pixel clock generator 100 of FIG. 1.

Referring to FIG. 3, the phase synchronizing circuit 130 may include a D-type flip-flop 132 configured to sample the multi-phase oscillation signal MOUT1 in response to the horizontal sync signal HSYNC, a decoder 134 configured to decode an output signal of the D-type flip-flop 132, and a multiplexer 136 configured to select the multi-phase oscillation signal MOUT1 to generate the first oscillation signal MOUT2 in response to an output signal of the decoder 134.

In the example of FIG. 3, the multi-phase oscillation signal MOUT1 may have a 16-bit signal, and the decoder 134 may decode the 16-bit signal to generate a 4-bit signal. However, this is only an example, and the number of bits of the multi-phase oscillation signal MOUT1 may be greater or fewer than 16 bits, and the number of bits of the signal output from the decoder may be greater or fewer than 4 bits. The multiplexer 136 selects at least one bit of the signal output from the decoder 134 as the first oscillation signal MOUT2.

Figure 4:
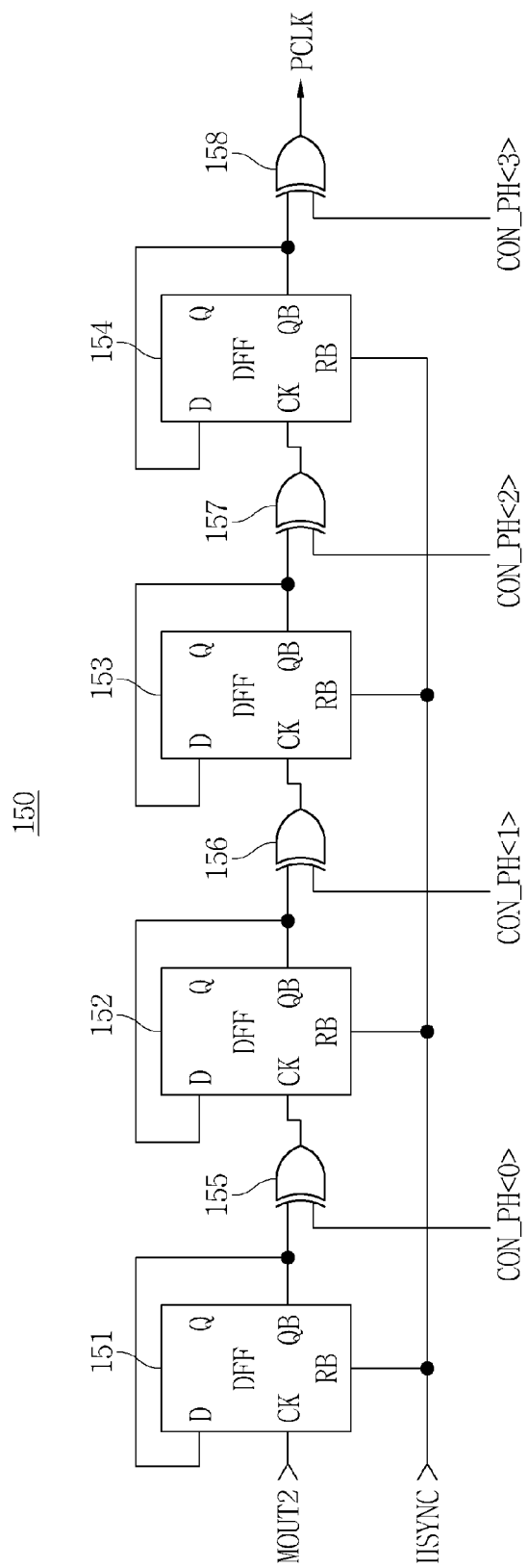
FIG. 4 is a circuit diagram illustrating an example of a delay control circuit included in the pixel clock generator of FIG. 1.

FIG. 4 is a circuit diagram illustrating an example of a delay control circuit included in the pixel clock generator 100 of FIG. 1.

The delay control circuit may include a plurality of unit delay control circuits. For example, referring to FIG. 4, the delay control circuit 150 may include a first D-type flip-flop 151, a first exclusive OR gate (XOR gate) 155, a second D-type flip-flop 152, a second exclusive OR gate 156, a third D-type flip-flop 153, a third exclusive OR gate 157, a fourth D-type flip-flop 154 and a fourth exclusive OR gate 158. Here, each unit delay control circuit comprises one of the D-type flip-flops and one of the exclusive OR gates. As an example, a first unit delay control circuit may include the first D-type flip-flop 151 and the first XOR gate 155, and a second unit delay control circuit may include the second D-type flip-flop 152 and second first XOR gate 156, and so on.

The first D-type flip-flop 151 has a clock terminal CK to which the first oscillation signal MOUT2 is applied, and a reset-bar terminal RB to which the horizontal sync signal HSYNC is applied. An input terminal D and an inverted output terminal QB of the first D-type flip-flop 151 are electrically connected. The first exclusive OR gate 155 has a first input terminal connected to the inverted output terminal QB of the first D-type flip-flop 151, and a second input terminal to which a first bit CON_PH<0> of a phase control signal is applied. The second D-type flip-flop 152 has a clock terminal CK to which an output signal of the first exclusive OR gate 155 is applied, and a reset-bar terminal RB to which the horizontal sync signal HSYNC is applied. An input terminal D and an inverted output terminal QB of the second D-type flip-flop 152 are electrically connected. The second exclusive OR gate 156 has a first input terminal connected to the inverted output terminal QB of the second D-type flip-flop 152, and a second input terminal to which a second bit CON_PH<1> of the phase control signal is applied. The third D-type flip-flop 153 has a clock terminal CK to which an output signal of the second exclusive OR gate 156 is applied, and a reset-bar terminal RB to which the horizontal sync signal HSYNC is applied. An input terminal D and an inverted output terminal QB of the third D-type flip-flop 153 are electrically connected. The third exclusive OR gate 157 has a first input terminal connected to the inverted output terminal QB of the third D-type flip-flop 153, and a second input terminal to which a third bit CON_PH<2> of the phase control signal is applied. The fourth D-type flip-flop 154 has a clock terminal CK to which an output signal of the third exclusive OR gate 157 is applied, and a reset-bar terminal RB to which the horizontal sync signal HSYNC is applied. An input terminal D and an inverted output terminal QB of the fourth D-type flip-flop 154 are electrically connected. The fourth exclusive OR gate 158 has a first input terminal connected to the inverted output terminal QB of the fourth D-type flip-flop 154, a second input terminal to which a fourth bit CON_PH<3> of the phase control signal is applied, and an output terminal from which the pixel clock PCLK is output.

Figure 5:
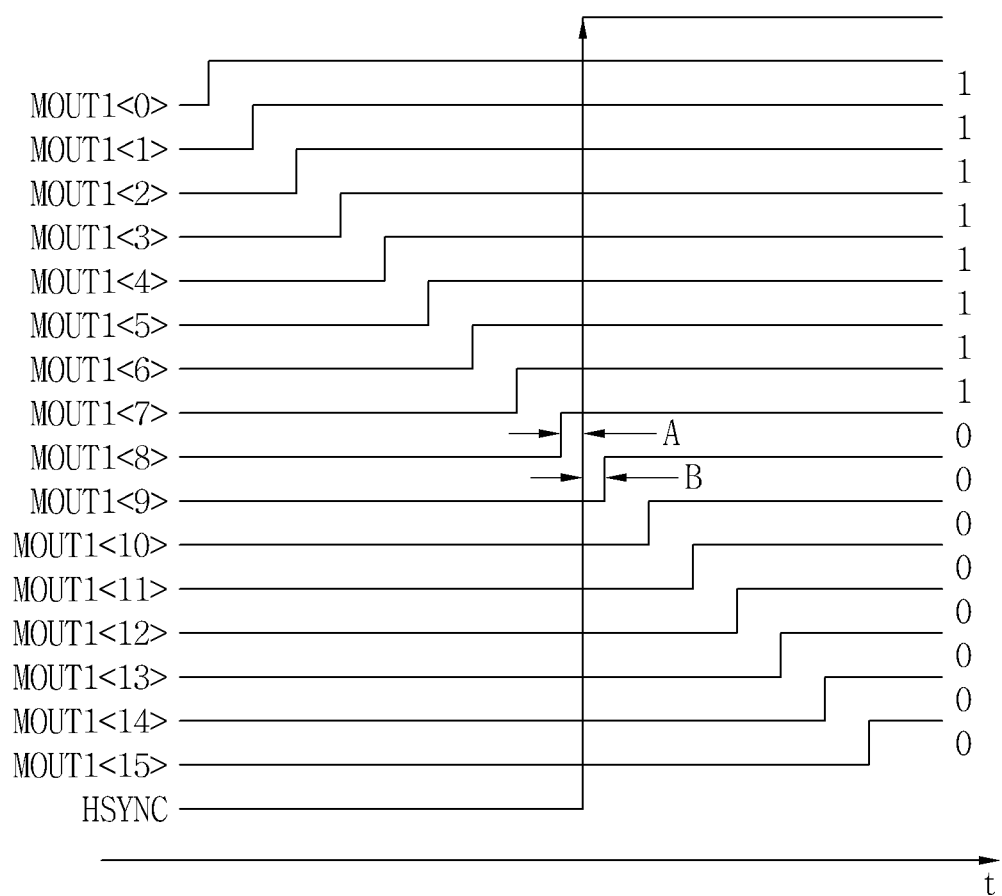
FIG. 5 is a diagram illustrating an example of a process of synchronizing a multi-phase oscillation signal that is an output of the PLL circuit of FIG. 1, with a horizontal sync signal.

FIG. 5 is a diagram illustrating an example of a process of synchronizing a multi-phase oscillation signal that is an output of the PLL circuit in FIG. 1 with the horizontal sync signal.

Referring to FIG. 5, the bits of the multi-phase oscillation signal MOUT1 may have continued values of a logic level "1" or "0". The multi-phase oscillation signal MOUT1 may be synchronized with the horizontal sync signal HSYNC by selecting a bit having a phase nearest to a rising edge of the horizontal sync signal HSYNC among bits of the multi-phase oscillation signal MOUT1. In the exemplary embodiment of FIG. 5, when sampling with the horizontal sync signal HSYNC, among the bits of multi-phase oscillation signal MOUT1, MOUT1<0> to MOUT1<8> may have a value of "1" and MOUT1<9> to MOUT1<15> may have a value of "0". That is, as shown in FIG. 5, at a time that the horizontal sync signal HSYNC changes from low to high, MOUT1<0> to MOUT1<8> may have a value of "1" and MOUT1<9> to MOUT1<15> may have a value of "0". The rising edge of the MOUT1<9> is the nearest to the rising edge of the horizontal sync signal HSYNC. That is, in FIG. 5, a time difference A is greater than a time difference B. Therefore, the MOUT1<9> may be the first oscillation signal MOUT2 that is the output of the phase synchronizing circuit 130.

Figure 6:
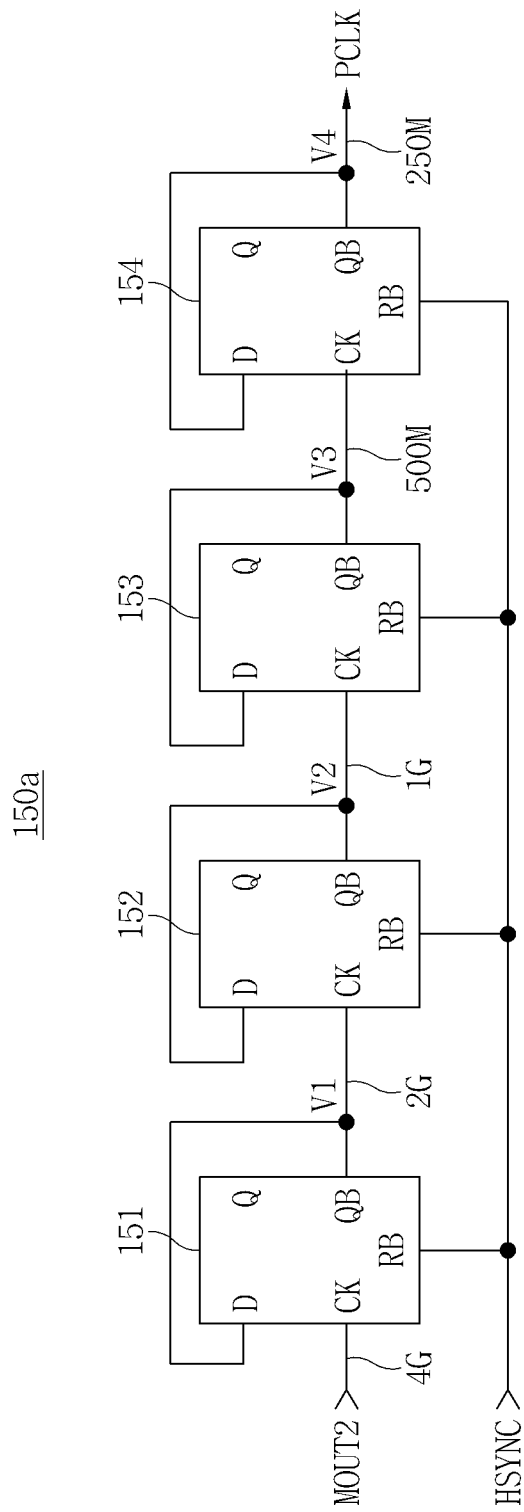
FIG. 6 is a simplified circuit diagram of the delay control circuit of FIG. 4.
Figure 7:
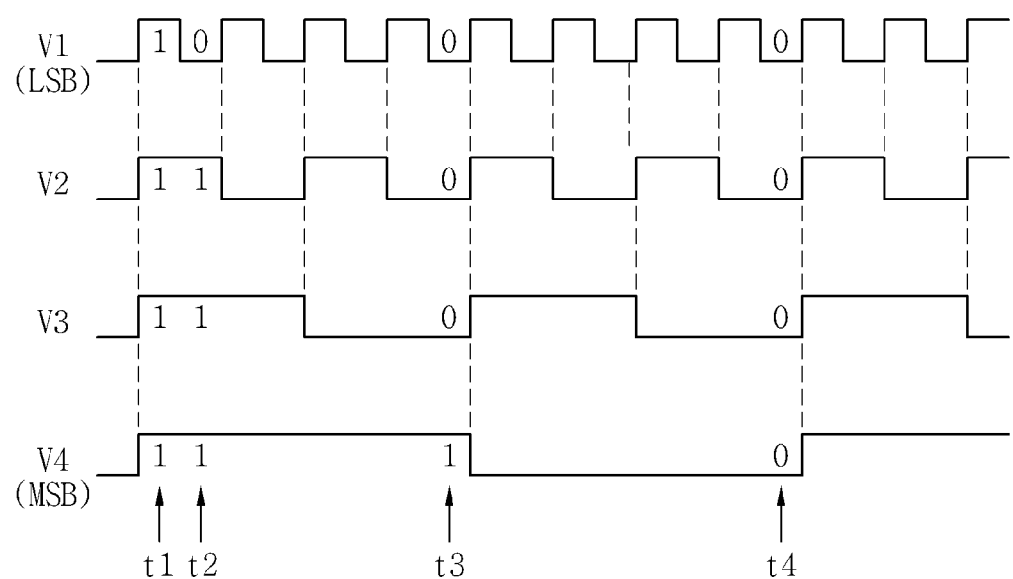
FIG. 7 is a timing diagram illustrating an operation of the delay control circuit of FIG. 6.

FIG. 6 is a simplified circuit diagram of the delay control circuit of FIG. 4. In the simplified delay control circuit 150a corresponds to the circuit diagram of FIG. 4 is redrawn by omitting the exclusive OR (XOR) gates in FIG. 4. FIG. 7 is a timing diagram illustrating an example of operation of the delay control circuit of FIG. 6.

With reference to the simplified delay control circuit 150a, when an input terminal D and an inverted output terminal QB of a D-type flip-flop are electrically connected to each other, an input signal is applied to a clock terminal CK, and an output signal is output from the inverted output terminal QB, the D-type flip-flop may divide a frequency of the input signal by two.

For example, when the horizontal sync signal HSYNC is enabled, all the output voltages V1 to V4 of the D-type flip-flops 151 to 154 are logic levels "1". When the first oscillation signal MOUT2 is 4 GHz, the output voltage V1 of the first D-type flip-flop 151 may have a frequency of 2 GHz, the output voltage V2 of the second D-type flip-flop 152 may have a frequency of 1 GHz, the output voltage V3 of the third D-type flip-flop 153 may have a frequency of 500 MHz, and the output voltage V4 of the fourth D-type flip-flop 154 may have a frequency of 250 MHz. That is, the frequency of the pixel clock PCLK may be 250 MHz.

Referring to FIG. 7, an example of the bits of V4, V3, V2 and V1 are shown and may be values of $1111_{(2)}$ at t1, values of $1110_{(2)}$ at t2, values of $1000_{(2)}$ at t3, and values of $0000_{(2)}$ at t4. Here, (2) indicates that the number is indicated in base 2; that is, $1110_{(2)}$ indicates that V4 is binary "1", V3 is binary "1", V2 is binary "1" and V1 is binary "0".

In the delay control circuit 150a of FIG. 6 in which XOR gates are omitted, when reset by the horizontal sync signal HSYNC, the output voltages V1 to V4 of the D-type flip-flops 151 to 154 may be reset to a logic level "1". However, in the delay control circuit 150 of FIG. 4 in which D-type flip-flops 151 to 154 and XOR gates 155 to 158 are included, an initial condition of the D-type flip-flops 151 to 154 may be set. For example, initial values of the output voltages V1 to V4 of the D-type flip-flops 151 to 154 may be changed according to values of bits CON_PH<0> to CON_PH<3> of the phase control signal applied to the XOR gates 155 to 158, respectively.

For example, returning to FIG. 4, assume that the initial values of the output voltages V1 to V4 of the D-type flip-flops 151 to 154 may have a value of $0110_{(2)}$. The time taken to change the initial value from $0110_{(2)}$ to $0000_{(2)}$ may be shorter than the time taken to change from $1111_{(2)}$ to $0000_{(2)}$. That is, a delay time between a generating of a first cycle of a pixel clock and a generating of a second cycle of a pixel clock may be different.

Therefore, the pixel clock generator 100 described in FIG. 1 may adjust the initial values of the output voltages V1 to V4 of the D-type flip-flops 151 to 154 by controlling respective bits CON_PH<0> to CON_PH<3> of the phase control signal applied to the delay control circuit 150. As such, the delay time of the pixel clock PCLK may be adjusted. Therefore, the phase of the pixel clock PCLK may be adjusted by controlling bits CON_PH<0> to CON_PH<3> of the phase control signal applied to the delay control circuit 150.

In the related art pixel clock generator, a delay-locked-loop (DLL) circuit should be included in the pixel clock generator to adjust a delay time of the pixel clock PCLK. By contrast, in the exemplary embodiments described above, the pixel clock generator 100 may control the phase of the pixel clock PCLK without the inclusion of a DLL circuit.

Figure 8:
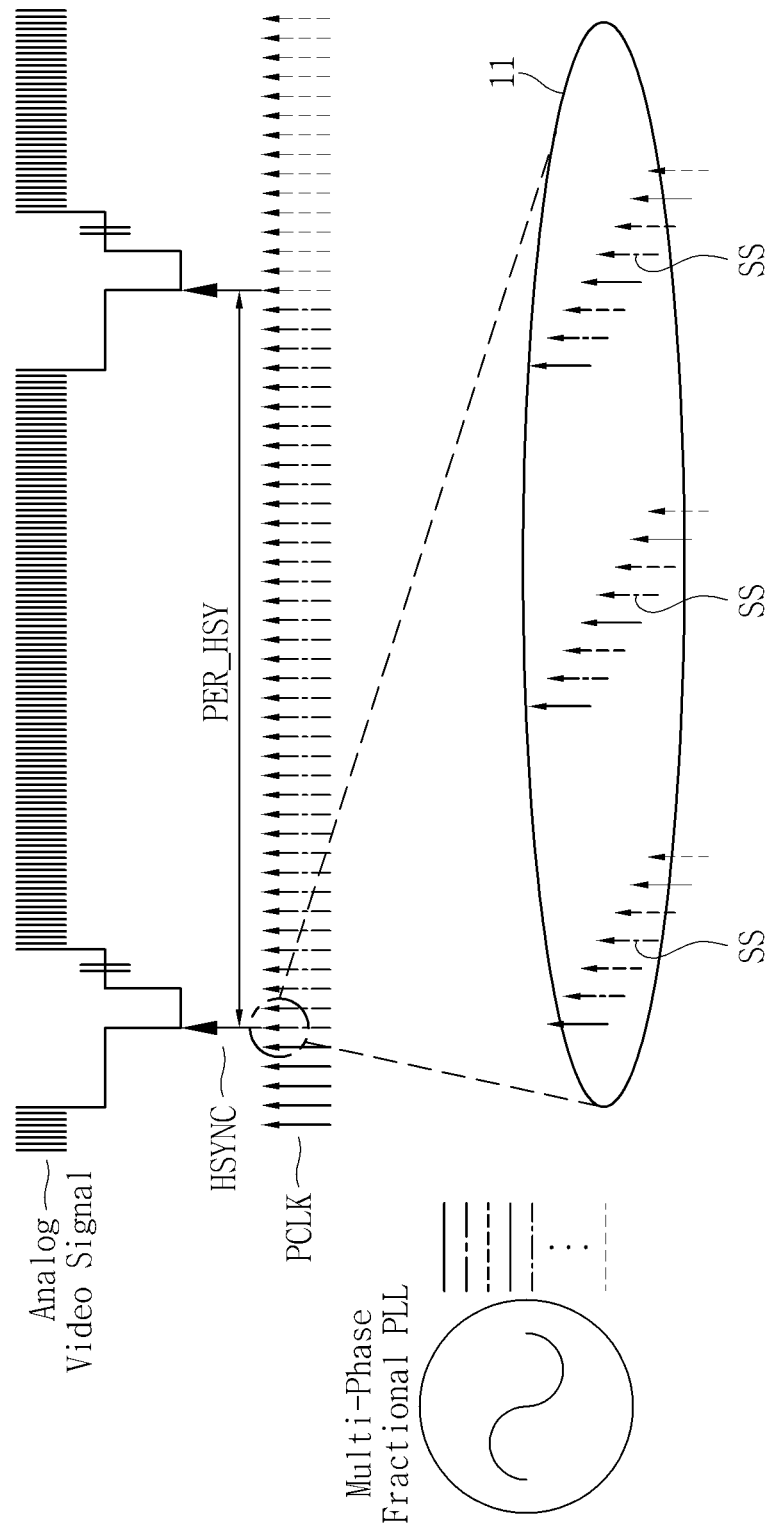
FIG. 8 is a diagram illustrating an example of a process of generating a pixel clock using a multi-phase oscillation signal, according to an exemplary embodiment.

FIG. 8 is a diagram illustrating an example of a process of generating a pixel clock using a multi-phase oscillation signal, according to an exemplary embodiment.

Referring to FIG. 8, the horizontal sync signal HSYNC is generated based on the analog video signal, and one of the bits of the multi-phase oscillation signal MOUT1 is selected using the horizontal sync signal HSYNC by the PLL circuit 110. The pixel clock PCLK is generated in response to the selected bit of the multi-phase oscillation signal MOUT1. In FIG. 8, PER_HSY denotes a period of the horizontal sync signal HSYNC, SS denotes a selected bit of the multi-phase oscillation signal MOUT1, and 11 denotes bits of the multi-phase oscillation signal MOUT1. In FIG. 8, 8 bits of the 16 bits of the multi-phase oscillation signal MOUT1 are shown for convenience of explanation.

Figure 9:
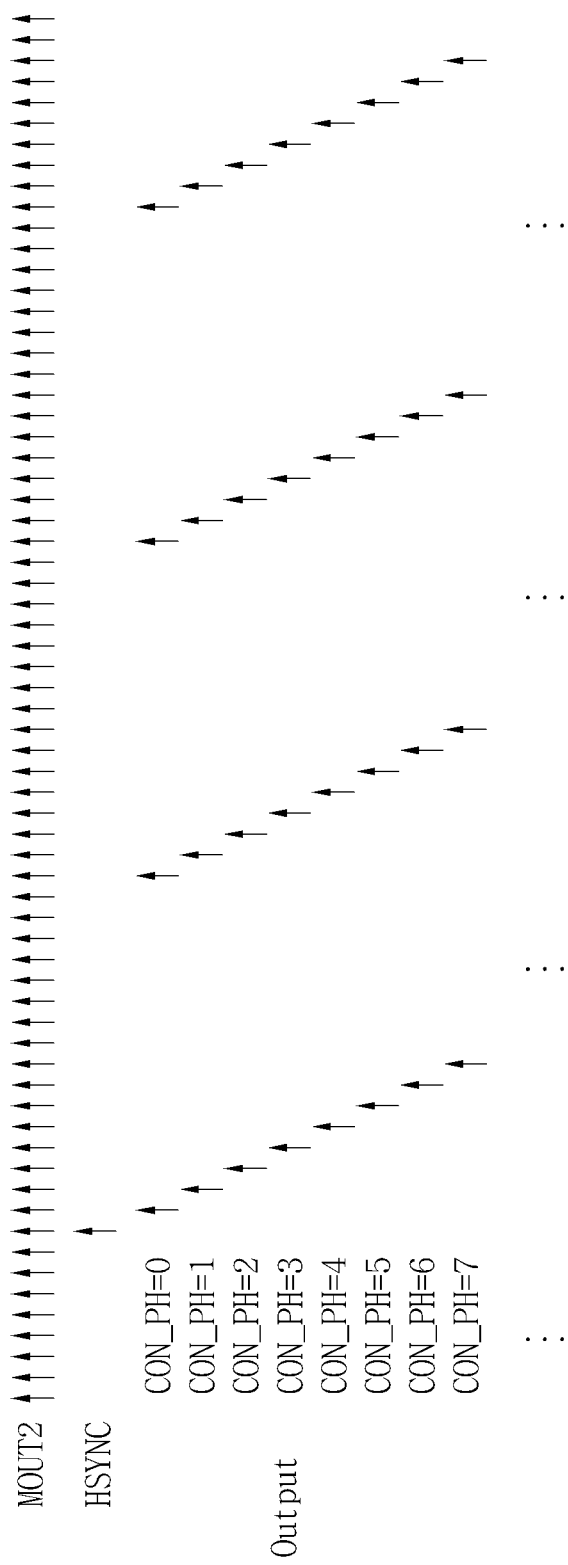
FIG. 9 is a diagram illustrating a phase change of a pixel clock according to a phase control signal in the delay control signal of FIG. 4.

FIG. 9 is a diagram illustrating a phase change of a pixel clock according to a phase control signal in the delay control signal of FIG. 4.

Referring to FIG. 9, the phase or the delay time of the output, that is the pixel clock, may be changed according to values of the phase control signal CON_PH.

Figure 10:
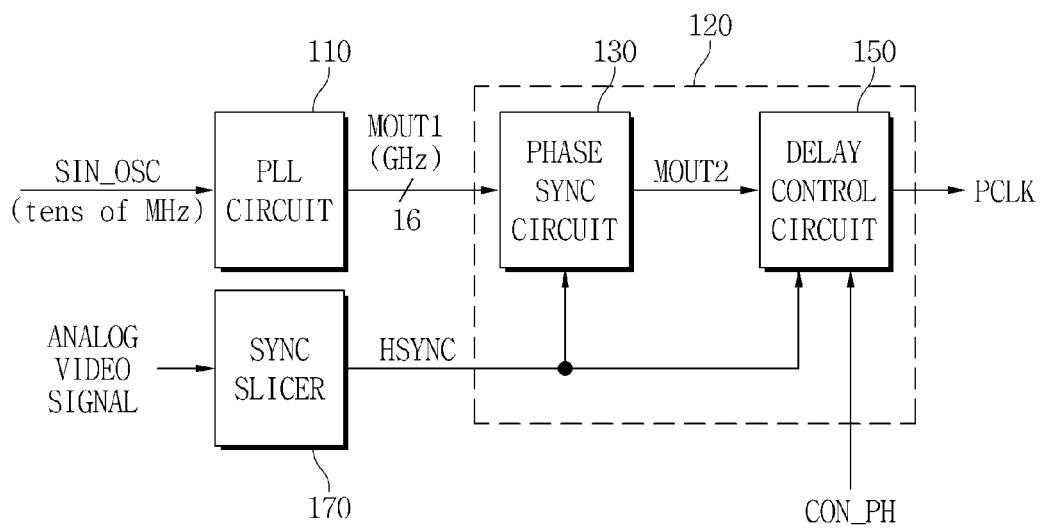
FIG. 10 is a block diagram illustrating a pixel clock generator in accordance with another exemplary embodiment.

FIG. 10 is a block diagram illustrating a pixel clock generator in accordance with another exemplary embodiment.

Referring to FIG. 10, a pixel clock generator 200 may include a phase-locked-loop (PLL) circuit 110, a frequency/phase adjusting circuit 120 and a sync slicer 170. The sync slicer 170 generates a horizontal sync signal (HSYNC) using an analog video signal. The pixel clock generator 200 of FIG. 10 has a structure similar to the pixel clock generator 100 of FIG. 1 except for the sync slicer 170, and operates similarly to that of FIG. 1.

Figure 11:
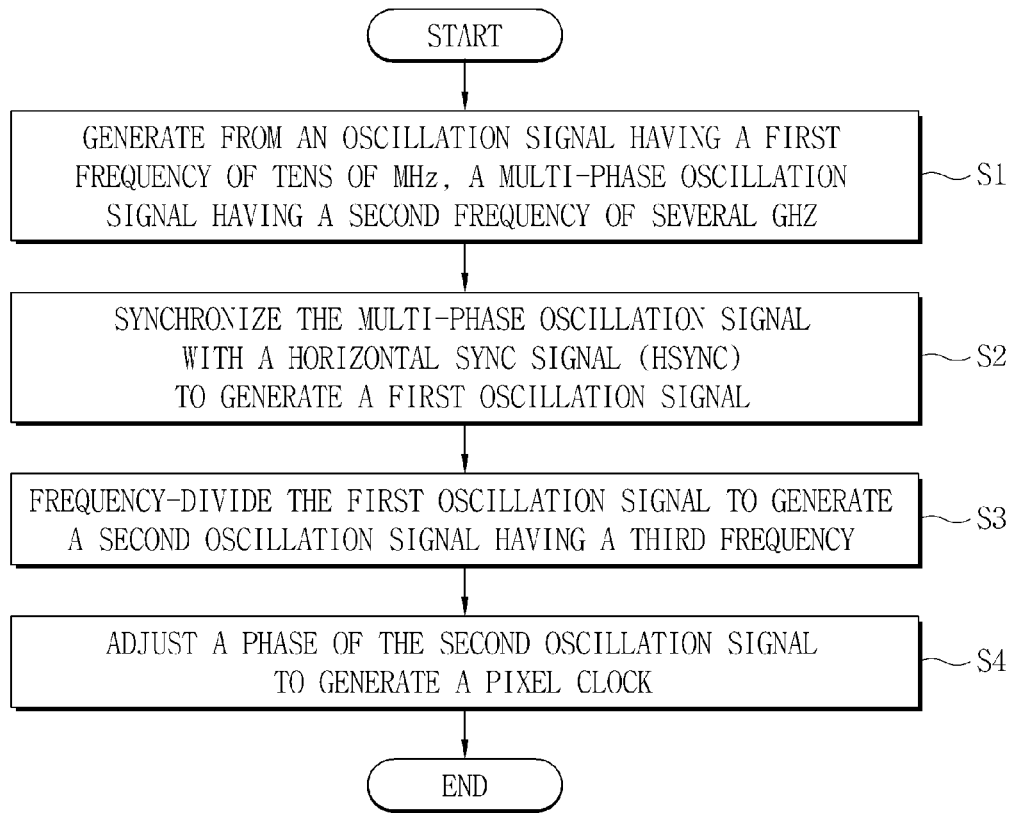
FIG. 11 is a flowchart illustrating a method of generating a pixel clock in accordance with an exemplary embodiment.

FIG. 11 is a flowchart illustrating a method of generating a pixel clock in accordance with an exemplary embodiment.

Referring to FIG. 11, a multi-phase oscillation signal having a second frequency of several gigahertz (GHz) is generated from an oscillation signal having a first frequency of tens of megahertz (MHz) (operation S1). The multi-phase oscillation signal is synchronized with a horizontal sync signal (HSYNC) to generate a first oscillation signal (operation S2). The first oscillation signal is frequency-divided to generate a second oscillation signal having a third frequency (operation S3) and a phase of the second oscillation signal is adjusted to generate a pixel clock (operation S4).

In the method of generating a pixel clock of FIG. 11, the third frequency may be suitable for controlling analog-digital conversion in a digital TV that includes a PLL circuit. Further, the operation of adjusting a phase of the second oscillation signal to generate the pixel clock may include the operation of controlling bits of a phase control signal to adjust an initial condition of a delay control circuit.

Figure 12:
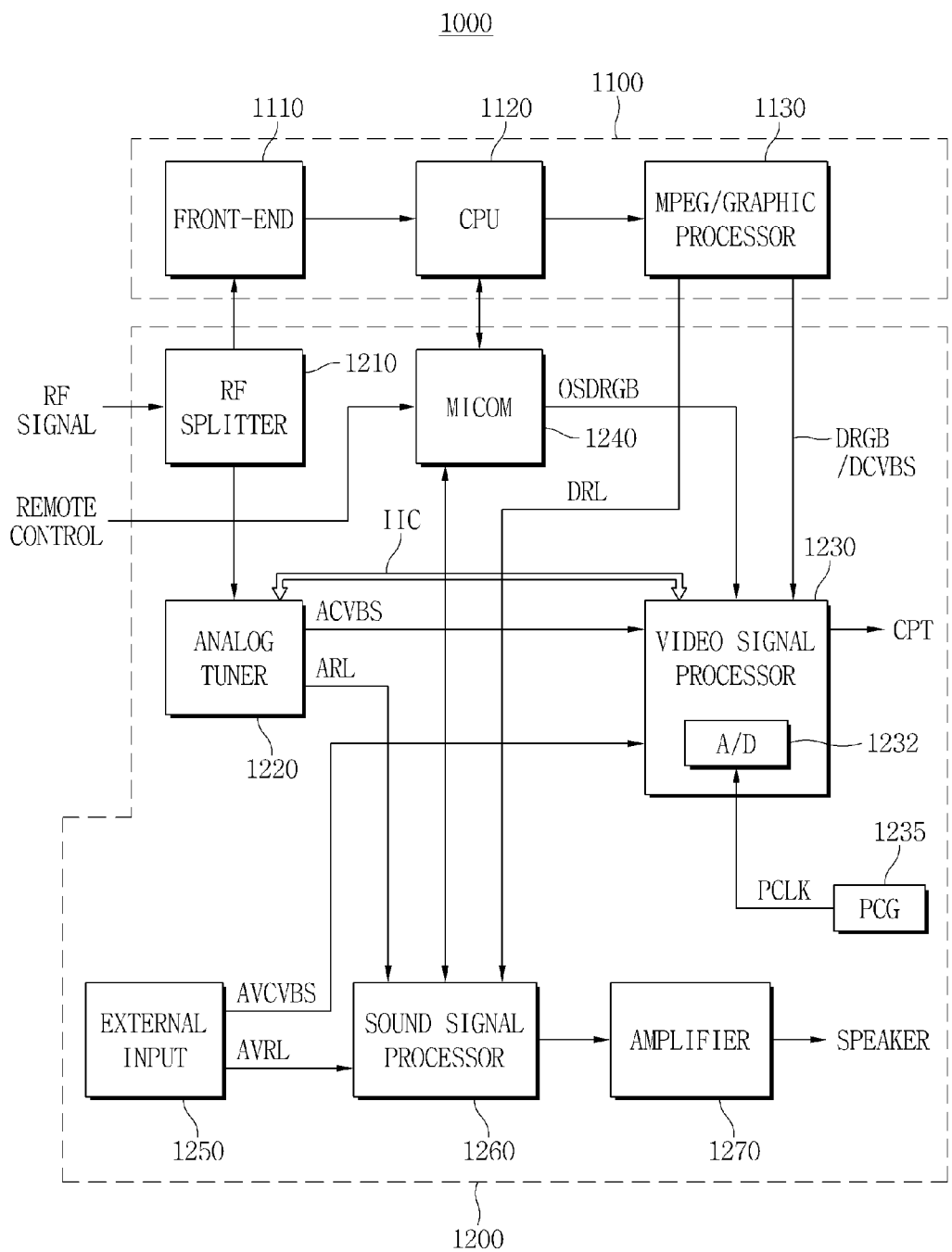
FIG. 12 is a block diagram illustrating a digital television including a pixel clock generator in accordance with exemplary embodiments.

FIG. 12 is a block diagram illustrating a digital television including a pixel clock generator in accordance with exemplary embodiments.

Referring to FIG. 12, a digital television 1000 may include a digital block 1100 and an analog block 1200. The digital block 1100 tunes and demodulates a digital broadcasting channel, and separates the demodulated signal into video/audio/data, and decodes the video/audio/data in an MPEG mode, and outputs an image signal DRGB/DCVBS and a sound signal DRL having an analog form. The analog block 1200 splits an analog broadcasting signal and a digital broadcasting signal from a ground-wave high frequency signal and tunes and demodulates an analog channel of the analog broadcasting signal, or demodulates an external video signal. Further, the analog block 1200 receives the image signal DRGB/DCVBS and the sound signal DRL from the digital block 1100 and displays an image signal on the display screen (CPT) and outputs a sound signal to a speaker.

The digital block 1100 may include a front-end 1110, a central processing unit (CPU) 1120 and an MPEG/GRAPHIC processor 1130. The front-end 1110 detects a digital channel of the analog broadcasting signal split by the analog block 1200, demodulates the detected signal, and outputs the signal as a transport stream TS. The CPU 1120 performs demultiplexing on the transport stream TS to split the transport stream TS into the video/audio/data, and receives a remote control signal from the analog block 1200 and sends the remote control signal to the MPEG/GRAPHIC processor 1130. In some exemplary embodiments, the CPU 1120 may process the remote control signal before sending the remote control signal to the MPEG/GRAPHIC processor 1130. The MPEG/GRAPHIC processor 1130 decodes the video/audio/data in an MPEG mode, and outputs the image signal DRGB/DCVBS and the sound signal DRL having an analog form to the analog block 1200. Further, the MPEG/GRAPHIC processor 1130, in a user interface (UI) mode, processes the remote control signal of the analog block 1200, and outputs the UI by loading the UI into the image signal DRGB/DCVBS.

The analog block 1200 may include an RF splitter 1210, an analog tuner 1220, a video signal processor 1230, a pixel clock generator 1235, a microcomputer (MICOM) 1240, an external input 1250, a sound signal processor 1260 and an amplifier 1270.

The RF splitter 1210 splits the analog broadcasting signal and the digital broadcasting signal from a ground-wave high frequency signal. The analog tuner 1220 detects an analog channel of the analog broadcasting signal split by the RF splitter 1210 and demodulates the detected signal to output an image signal ACVBS and a sound signal ARL. The external input 1250 demodulates an external video signal to output an image signal AVCVBS and a sound signal AVRL. The video signal processor 1230 performs video processing on the image signal ACVBS of the analog tuner 1220, the image signal AVCVBS of the external input 1250, and/or the image signal DRGB/DCVBS received from the digital block 1100 to display an image on a display screen CPT. The video signal processor 1230 may include an analog-to-digital (A/D) converter 1232. The pixel clock generator 1235 may include the pixel clock generator in accordance with the exemplary embodiments. The sound signal processor 1260 performs sound processing on the sound signal ARL of the analog tuner 1220, the sound signal AVRL of the external input unit 1250, and/or the sound signal DRL received from the digital block 1100. The amplifier 1270 amplifies an output signal of the sound signal processor 1260 and outputs the sound signal to a speaker. The microcomputer (MICOM) 1240 receives an input from a remote control and outputs a remote control signal for UI display to the CPU 1120 of the digital block 1100 in a digital receiving mode, and outputs an output signal OSDRGB for UI to the video signal processing unit 1230 in an analog receiving mode.

In the above, the pixel clock generator used in a digital television is mainly described, but the pixel clock generator according to exemplary embodiments may applied to an image signal processing system including a digital television.

Exemplary embodiments of the inventive concept may apply to a pixel clock generator, and/or a television system and/or a video system including the pixel clock generator.

The pixel clock generator according to exemplary embodiments generates a high frequency signal using an oscillation signal having a frequency of tens of MHz that is higher than a frequency of the horizontal sync signal (HSYNC), and adjusts a phase of the high frequency signal to generate a pixel clock. The pixel clock generator does not therefore need an off-chip capacitor. Further, the pixel clock generator according to exemplary embodiments has a simple circuit configuration, a small chip size, low power consumption, and low jitter noise because the pixel clock generator adjusts a phase of the pixel clock using a frequency/phase adjusting circuit comprising D-type flip-flops and exclusive OR gates connected to the D-type flip-flops.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures. Therefore, it is to be understood that the foregoing is illustrative of various exemplary embodiments and is not to be construed as limited to the specific exemplary embodiments disclosed, and that modifications to the disclosed exemplary embodiments, as well as other embodiments, are intended to be included within the scope of the appended claims.

What is claimed is:

1. A pixel clock generator, comprising:
a phase-locked-loop (PLL) circuit configured to generate, from an oscillation signal having a first frequency of tens of MHz, a multi-phase oscillation signal having a second frequency of several GHz; and
a frequency/phase adjusting circuit configured to synchronize the multi-phase oscillation signal with a horizontal sync signal to generate a first oscillation signal, frequency-divide the first oscillation signal to generate a second oscillation signal, and adjust a phase of the second oscillation signal to generate the pixel clock.

2. The pixel clock generator of claim 1, wherein the second oscillation signal has a third frequency, and the third frequency is a frequency suitable for controlling analog-digital conversion in a digital TV that includes the PLL circuit.

3. The pixel clock generator of claim 2, wherein the third frequency has a range of about 10 MHz to about 200 MHz.

4. The pixel clock generator of claim 1, wherein the frequency/phase adjusting circuit comprises:
a phase synchronizing circuit configured to synchronize the multi-phase oscillation signal with the horizontal sync signal to generate the first oscillation signal; and
a delay control circuit configured to frequency-divide the first oscillation signal to generate the second oscillation signal, and adjust the phase of the second oscillation signal to generate the pixel clock.

5. The pixel clock generator of claim 4, wherein a bit having a phase nearest to the horizontal sync signal among bits of the multi-phase oscillation signal is selected to synchronize the multi-phase oscillation signal with the horizontal sync signal.

6. The pixel clock generator of claim 4, wherein the multi-phase oscillation signal comprises a plurality of bit signals, and the phase synchronizing circuit comprises:
a D-type flip-flop configured to sample the multi-phase oscillation signal in response to the horizontal sync signal;
a decoder configured to decode an output signal of the D-type flip-flop; and
a multiplexer configured to select a bit signal of the plurality of bit signals output from the decoder to generate the first oscillation signal.

7. The pixel clock generator of claim 4, wherein the delay control circuit comprises a plurality of unit delay control circuits cascade-connected to each other, wherein each of the unit delay control circuits comprises:
a D-type flip-flop having a clock terminal to which an input signal is applied and a reset-bar terminal to which the horizontal sync signal is applied, wherein the input terminal and an inverted output terminal are electrically connected; and
an exclusive OR gate having a first input terminal electrically connected to the inverted output terminal of the D-type flip-flop, a second input terminal to which one bit of a phase control signal is applied, and an output terminal from which an output signal of the unit delay control circuit is generated.

8. The pixel clock generator of claim 7, wherein each unit delay control circuit is configured to frequency-divide the input signal of the unit delay control circuit by two to generate the output signal of the unit delay control circuit.

9. The pixel clock generator of claim 7, wherein all of output signals of the unit delay control circuits are configured to have a logic level "1" when the horizontal sync signal is enabled.

10. The pixel clock generator of claim 4, wherein the delay control circuit comprises:
a first D-type flip-flop having a clock terminal to which the first oscillation signal is applied and a reset-bar terminal to which the horizontal sync signal is applied, wherein an input terminal and an inverted output terminal are electrically connected;
a first exclusive OR gate having a first input terminal connected to the inverted output terminal of the first D-type flip-flop and a second input terminal to which a first bit of a phase control signal is applied;
a second D-type flip-flop having a clock terminal to which an output signal of the first exclusive OR gate is applied and a reset-bar terminal to which the horizontal sync signal is applied, wherein an input terminal and an inverted output terminal are electrically connected;
a second exclusive OR gate having a first input terminal connected to the inverted output terminal of the second D-type flip-flop and a second input terminal to which a second bit of the phase control signal is applied;
a third D-type flip-flop having a clock terminal to which an output signal of the second exclusive OR gate is applied and a reset-bar terminal to which the horizontal sync signal is applied, wherein an input terminal and an inverted output terminal are electrically connected;
a third exclusive OR gate having a first input terminal connected to the inverted output terminal of the third D-type flip-flop and a second input terminal to which a third bit of the phase control signal is applied;
a fourth D-type flip-flop having a clock terminal to which an output signal of the third exclusive OR gate is applied and a reset-bar terminal to which the horizontal sync signal is applied, wherein an input terminal and an inverted output terminal are electrically connected; and
a fourth exclusive OR gate having a first input terminal connected to the inverted output terminal of the fourth D-type flip-flop, a second input terminal to which a fourth bit of the phase control signal is applied, and an output terminal from which the pixel clock is output.

11. The pixel clock generator of claim 1, wherein the PLL circuit does not include an off-chip capacitor.

12. The pixel clock generator of claim 1, further comprising:
a sync slicer configured to generate the horizontal sync signal using an analog video signal.

13. A pixel clock generator, comprising:
a phase-locked-loop (PLL) circuit configured to generate, from an oscillation signal having a first frequency, a multi-phase oscillation signal having a second frequency;
a phase synchronizing circuit configured to synchronize the multi-phase oscillation signal with a horizontal sync signal to generate a first oscillation signal; and
a delay control circuit configured to frequency-divide the first oscillation signal to generate a second oscillation signal, and adjust a phase of the second oscillation signal to generate a pixel clock.

14. The pixel clock generator of claim 13, wherein the first frequency is a frequency of from about 10 MHz to about 90 MHz, and the second frequency is a frequency of from about 10 GHz to 90 GHz.

15. The pixel clock generator of claim 13, wherein the third frequency is a frequency suitable for controlling analog-digital conversion in a digital TV that includes the PLL circuit.

16. The pixel clock generator of claim 13, wherein a phrase control signal is received by the delay control circuit and bits of the phase control signal are applied to adjust an initial condition of the delay control circuit.

17. The pixel clock generator of claim 16, wherein a time between a first cycle and a second cycle of the pixel clock is changed according to the initial condition of the delay control circuit.

18. The pixel clock generator of claim 13, wherein a phase control signal is received by the delay control circuit and bits of the phase control signal are applied to adjust a delay time of the pixel clock.

19. The pixel clock generator of claim 13, wherein a phase control signal is received by the delay control circuit and bits of the phase control signal applied to adjust a phase of the pixel clock.

20. The pixel clock generator of claim 13, wherein the PLL circuit has a wide bandwidth.

* * * * *